Jan. 1, 1957 V. J. CALDECOURT 2,776,404
MAGNETOMETER
Filed Feb. 28, 1955 2 Sheets-Sheet 1
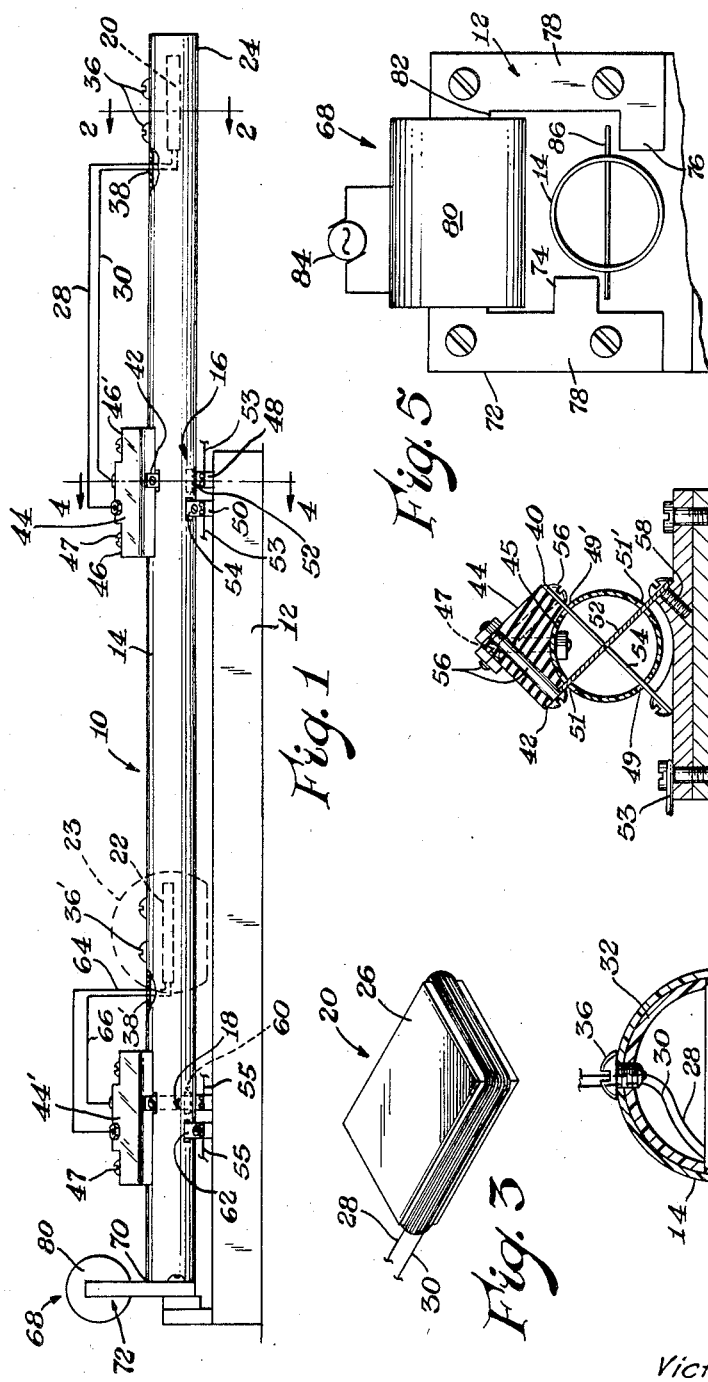
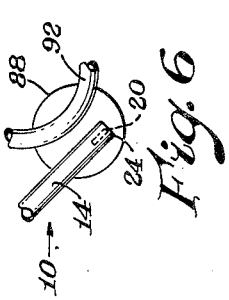
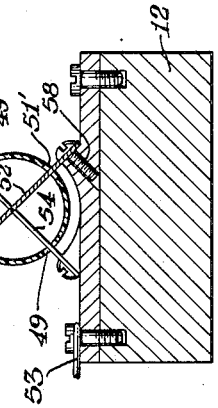
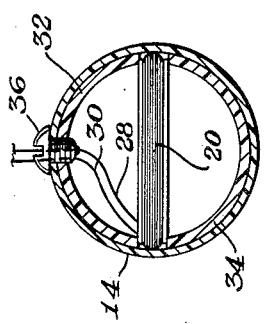
INVENTOR.
Victor J. Caldecourt
BY
Griswold & Burdick
ATTORNEYS INVENTOR.
Victor J. Caldecourt
BY
Griswold & Burdick
ATTORNEYS

United States Patent Office 2,776,404
Patented Jan. 1, 1957

2,776,404

MAGNETOMETER

Victor J. Caldecourt, Midland, Mich., assignor to The Dow Chemical Company, Midland, Mich., a corporation of Delaware Application February 28, 1955, Serial No. 490,801

7 Claims. (Cl. 324—47)

This invention relates to magnetometers and particularly to magnetometers which are adapted for use with mass spectrometers.

Most mass spectrometers produce a mass spectrum which is accurately calibrated in peak height but only roughly calibrated in mass. Where the analytical problems involve only a mass range of 2–100 rough mass calibration often proves sufficient. However, when samples to be analyzed have components in the mass range from 100–400 a more precise means for calibrating the mass of the components is needed. For example, the difference in magnetic field strength between mass 400 and mass 401 is about one part in a thousand.

Moving coil magnetometers have been favorably considered for use in mass spectrometers because such magnetometers produce an output signal or potential which is directly proportional to the strength of the magnetic field they are to measure. Further, if a multiturn coil is used in the magnetometer a substantial output potential can be developed. When previously known moving coil magnetometers have been used to measure changes in mass (in terms of changes in magnetic field strength of the magnet in the mass spectograph) of the order of one part in a thousand, it has been generally found that the signal due to the inherent noise level of the instrument was in excess of the signal resulting from such a small change in mass. The main source of noise has been observed to be the commutator or slip rings used in transferring the magnetometer signal from the probe to its utilization circuit. Thus, for many purposes such magnetometers do not provide the desired accuracy in mass reading.

Accordingly, a principal object of this invention is to provide an improved magnetometer probe which is capable of producing a high output potential and has a low inherent noise level.

Another object of this invention is to provide an improved magnetometer system which is adapted for use with a mass spectrometer.

In accordance with this invention there is provided a magnetometer probe assembly adapted to have an end thereof inserted between the magnet poles of a mass spectrometer. The probe assembly comprises an elongated tube, made of non-magnetic material, which is mounted on two pairs of crossed leaf springs which are fastened at the lower end thereof to a base and at the top to the tube. One end of the tube extends between the magnet poles of a mass spectrometer and the other end of the tube is magnetically driven to impart a rotational oscillatory motion to the tube around its longitudinal axis. The tube contains two galvanometer coils, one of which is disposed at the end which is adapted to be inserted between the magnet poles. The other or second coil is similarly disposed in the tube but is substantially out of the field of the mass spectrometer magnet. A fixed or reference magnet of known strength has its pole pieces positioned on opposite sides of the tube at the location of the second galvanometer coil. The electrical leads from the coils are brought out through the leaf springs and thence applied to an indicating unit.

The invention, as well as additional objects and advantages thereof, will best be understood when the following detailed description is read in connection with the accompanying drawings, in which:

Fig. 1 is a side elevational view of a magnetometer probe made in accordance with this invention;

Fig. 2 is an enlarged sectional view taken along the lines 2—2 of Fig. 1 and showing the signal pickup coil disposed at the end of the tube;

Fig. 3 is an enlarged isometric view of a signal pickup coil of the type shown in Fig. 2;

Fig. 4 is a somewhat enlarged sectional view taken along the lines 4—4 of Fig. 1 and showing one leaf spring suspension system and electrical lead-out means of the probe;

Fig. 5 is a diagrammatical view of the means for oscillating the magnetometer tube shown in Fig. 1;

Fig. 6 is a reduced scale fragmentary diagrammatical view showing the probe coil end of the magnetometer assembly in position over a magnet pole of a mass spectrometer;

Figure 7:
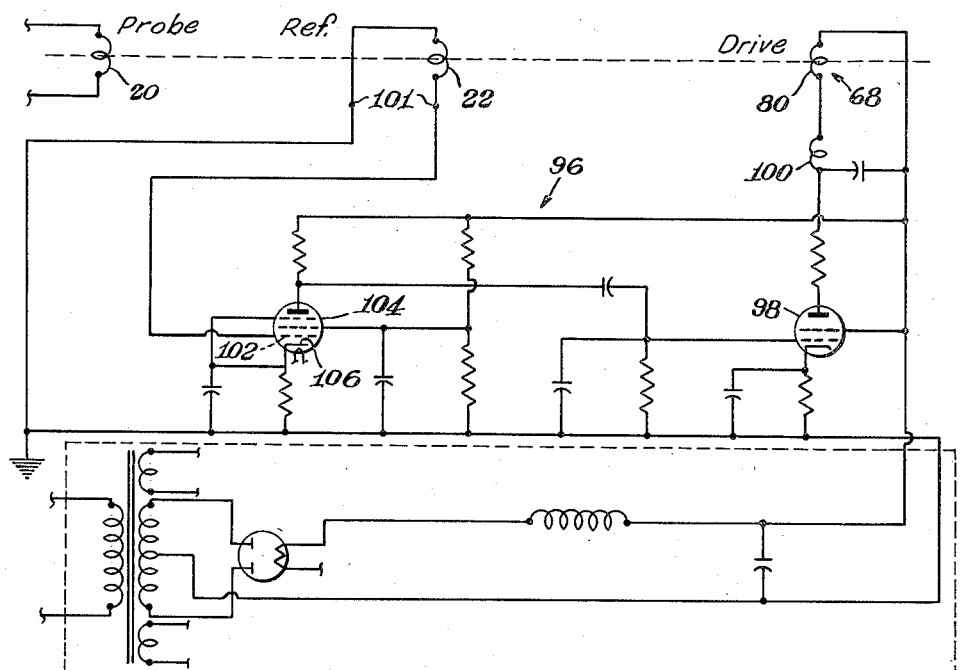
Fig. 7 is a schematic diagram of a probe oscillator circuit which is suitable for use with this invention.

Referring to Fig. 1, there is shown a magnetometer probe assembly indicated generally by the numeral 10. The probe assembly 10 comprises a rigid base 12, usually made of insulating material, to which an elongated tubular housing 14, often referred to merely as "the tube," of non-magnetic material is secured by two assemblies of crossed leaf springs indicated generally by the numerals 16, 18. The tubular housing 14 contains two galvanometer coils 20, 22. One coil 20, the "probe" coil, is disposed at the free end 24 of the housing 14 which extends beyond the base 12. The other or reference coil 22 is disposed within the tube 14 between the two spring assemblies 16, 18.

The coil 20, as shown in Fig. 3, comprises a plurality of turns of insulated wire wound around a rectangular form or frame 26 of non-magnetic material. The coil 20 has two leads, 28, 30 extending therefrom.

Referring to Figs. 1, 2 and 4, it may be seen that the coil 20 is horizontally disposed with respect to the base 12 when the tube 14 is in its "rest" or non-operating position, and is tightly retained in that position by the bushing segments 32, 34. The top bushing segment 32 is held in place by a screw 36 which passes through the wall of the housing 14 and through the bushing segment 32. The two leads 28, 30 from the probe coil 20 pass through an aperture 38 in the wall of the tube 14 and are connected to terminals 40, 42 on the upper spring mounting block or means 44 for the spring assembly 16.

Referring especially to Fig. 1 and Fig. 4, it may be seen that the spring assembly 16 comprises an upper spring mounting block 44 made of electrically insulating material and which has a lower concavely curved tube engaging surface 45 with the same radius of curvature as the convexly curved outer wall surface of the tubular housing 14. The transverse cross section and general shape of the upper spring mounting member 44 is like that of a segment of cove molding. However, the insulating spring mounting block member 44 has a flattened top part 46, 46' at each end. Bolts 47 extend through the insulating member 44 from the flattened top parts 46, 46' thereof and into the interior of the tubular housing 14 to secure the insulating upper spring mounting block member 44 to the top of the tubular housing 14.

Two lower spring mounting blocks 48, 50 which also serve as electrical terminals, are secured to the base 12 at a position below the insulating block member 44. The blocks 48, 50 are usually made of metal but are insulated one from another. Each of the leaf springs 52, 54 extends through a pair of oppositely disposed slots (49, 49', or 51, 51') in the tubular housing 14 but does not touch the housing 14 during operation of the magnetometer. Each spring 52, 54 is secured at its upper end to the insulating block 44 by a bolt 56 and at its lower end to one of the terminal blocks 48, 50 by a bolt 58. The surfaces of the insulating block 44 and of the mounting blocks 48, 50 to which the ends of the springs 49, 51 etc. are secured are so aligned with respect to the springs that when the tube 14 is at rest each of the spring segments 49, 51 is substantially free from bends and is subject to substantially the same tension (which is small). One of the leads 28, 30 from the probe coil 20 is electrically connected to each bolt 56 which secures an end of a leaf spring 52, 54 to the insulating block 44. The leaf springs 52, 54, which do not touch one another, provide an excellent, substantially noise free means for electrically connecting the probe coil 20 (and the reference coil also, as will be discussed later) to external circuitry by connecting other leads, such as 53, to the terminal blocks 48, 50 and to external circuitry. Also, when the springs 52, 54 are used as electrical lead means as described above there is no commutator, slip ring or other electrical device to add inertia to the vibrating tubular housing 14 during operation of the probe assembly 10.

As mentioned before, another coil, the "reference" coil 22, is disposed within the tubular housing 14 between the two spring assemblies 16, 18. The reference coil 22 is usually identical in form and electrical characteristics to the probe coil 20, although not necessarily so. However, when identical coils 20, 22 are used, and are similarly positioned within the housing 14 and undergo the same motion during the operation of the magnetometer, the problem of calibration of the magnetometer is simplified. The reference coil 22 is so positioned within the tubular housing 14 that it is in substantial axial alignment with the probe coil 20 and is retained in that position by bushing segments 32', 34' which are held in place by screws 36' as in the case of the segments 32, 34 which retain the probe coil 20 in position in the tube 14. An external fixed reference magnet, one of whose pole pieces is indicated by the dotted lines 23, surrounds the tube 14 at the location therein of the reference coil 22.

The spring assembly 18 is substantially identical to the spring assembly 16. The springs 60, 62 are used to electrically connect the leads 64, 66 from the reference coil 22 to the terminal and mounting blocks 48', 50' which are connected to the base 12. External circuit leads 55 are secured to the terminal mounting blocks 48', 50'.

An electromagnetic driving means, indicated generally by the numeral 68, for vibrating the tubular housing 14, is shown semi-diagrammatically in Fig. 5 as well as in elevation in Fig. 1. The driving means 68 is secured to the base 12 at the end 70 of the tubular housing 14 which is remote from the probe coil 20. The driving means 68, as illustrated, is an adaptation of an electric clock motor and comprises a core 72 which is generally U-shaped but in which pole pieces 74, 76 extend inwardly from each leg 78 of the U. A coil winding 80, disposed around the base 82 of the U in the core 72, is adapted to be energized by a suitable alternating current source such as the schematically represented alternator 84. A metal vane 86 which is attached to the end 70 of the tubular housing 14 lies adjacent to the pole pieces 74, 76. When the coil 80 is energized with alternating current, the vane 86 is attracted first towards one pole piece and then towards the other in a periodic manner. The mechanical loading of the tubular housing 14 and spring assemblies 16, 18 is such that the vane 86 does not touch either pole piece 74 or 76 during the time the tube is vibrating or oscillating. That is, before the field of one pole piece can move the vane 86 (which is spring mounted by the spring assemblies 16, 18) to the pole piece 74, the alternating field reverses polarity and the vane 86 is then attracted towards but does not reach the other pole piece 76.

The magnetometer probe assembly 10, as diagrammatically shown in Fig. 6, is adapted to be mounted in a mass spectrometer between the magnetic pole pieces thereof. To simplify the plan view of Fig. 6, only a single pole piece 88 is shown, but the other pole piece would in practice lie above the pole piece 88. The end 24 of the housing 14 containing the probe coil 20 is inserted between the pole pieces 88 and lies beside the tube 92 through which are passed samples to be analyzed. Thus, for practical purposes the samples to be analyzed and the probe coil 20 are subjected to the same magnetic field strength in the mass spectrometer.

The reference coil is, at the same time, disposed between the pole pieces 23 of a fixed magnet (see Fig. 1). Thus, the potential developed in the reference coil 22 is a function of the strength of the field of the fixed reference magnet while the potential developed in the probe coil 20 is a function of the field strength of the mass spectrometer magnet (and thus a function of mass).

Fig. 7 shows a circuit diagram of an oscillator and power supply for supplying alternating current energy to the driving means 68 used to vibrate the tubular housing 14. The power supply, shown enclosed by the dotted lines 94, is of conventional design and supplies about 250 volts for the anode and screen grid potentials plus low voltage heater potentials. The oscillator circuit, indicated generally by the numeral 96, is an adaptation of a tuning fork oscillator circuit shown in "Industrial Electronic Circuits" by Markus and Zeluff, 1948 edition, published by McGraw-Hill Book Company. The anode circuit of the oscillator output tube 98 includes both the coil winding 100 of a vibrator or D. C. chopper which is used in the mass indicator apparatus (which is to be described later) and the winding 80 on the driving means 68. The energy feedback to the control grid 102 of the first tube 104 of the oscillator is accomplished by applying the potential induced in the reference coil 22 between the cathode 106 and control grid 102 of the tube 104. See Fig. 8 for terminals 101 from which reference potential is obtained. Because the tube 104 is operated without grid current flowing, no power is drawn from the reference coil circuit. Under these conditions the stability of the reference potential is not affected by the tube.

Actual values for the oscillator circuit parameters as well as a discussion of the magnetometer in general may be found in the article "A mass indicator using a vibrating coil magnetometer," by Caldecourt and Adler, which appears in the October 1954 issue of The Review of Scientific Instruments.

Figure 8:
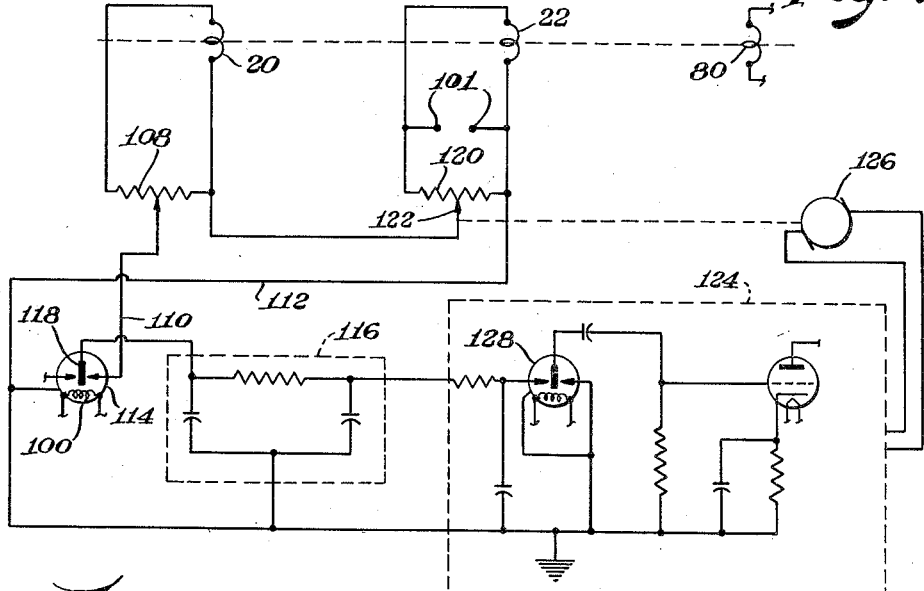
Fig. 8 is a simplified schematic circuit diagram of a mass indicator which is suitable for use in this invention.

A simplified schematic diagram of the mass indicator is shown in Fig. 8. The reference coil 22 and the probe coil 20 are connected in series with their induced potentials in opposition. The terminals 101 provide a means for connecting a grid feedback signal to the oscillator tube 104. A potentiometer 108 across the probe coil 20 is adjusted to insure that the output of the probe coil 20 under the condition of maximum flux of the spectrometer magnet will not exceed the output of the reference coil. In practice the potentiometer 108 is adjusted such that the variable signal taken off the probe coil 20 is, at any time, at least slightly less than the constant output potential of the reference coil 22. This assures that all mass values encountered may be measured and recorded by means of the servo system of the mass indicator.

The leads 110, 112 carrying the combined output of the probe coil 20 and the reference coil 22 are connected to a half wave rectifier 114 of the synchronous vibrator type and a resistance capacitance filter circuit enclosed within the dotted lines 116. The driving coil 100 of the vibrator 114 is the coil winding appearing in the anode circuit of the probe oscillator. By driving the vibrator reed 118 at the same frequency as the alternating current induced in the coils 20, 22, only alternate half cycles of the combined alternating current output of the coils 20, 22 (i. e., pulsating D. C.) are applied across the resistance-capacitance filter network 116. The output of the filter network 116 is substantially smooth direct current having a value which is a function of the difference in the potentials as taken across the potentiometer of the probe coil and a potentiometer 120 shunting the reference coil 22. The probe coil potentiometer 108, once it is adjusted as mentioned above, is not changed during the operation of the mass indicator. The potentiometer 120 shunting the reference coil 22, however, may have its resistance scale calibrated in terms of mass or mass may be read from a separate but synchronously driven scale. When the potentiometer 120 is adjusted to provide zero net output potential across the series connected probe and reference coils 20, 22 (assuming their induced potentials are 180° out of phase) as measured across the output of the resistance-capacitance filter 116, the position of the moving arm 122 of the potentiometer 120 is a function of the voltage induced in the probe coil 20 and thus a function of mass as represented by the flux density of the mass spectrometer magnet (field between the magnet poles 88).

The output of the filter section 116 (which is direct current) is coupled to a modified Brown amplifier 124 and servomotor system 126. The output of the filter 116 is passed through a 60 cycle vibrator or chopper 128 to convert this output to 60 cycle alternating current which is then amplified. The output of the modified Brown amplifier 124 is used to control the servomotor 126 which is coupled to a moveable mass scale and to the potentiometer arm 122. With the moveable arm 122 of the potentiometer 120 positioned to balance the potentials taken from the probe coil 20, the servomotor 126 does not operate. However, a change in probe potential (either increase or decrease) causes the servomotor 126 to rotate the moveable arm 122 of the potentiometer and again balance the two opposing potentials of the probe and reference coils. Because the mass indicator is required to indicate very small changes in mass, the servomotor system 126 must be responsive to minute variations in output of the filter section. It has been found that noise potentials as low as .0002 volt cause jerky, erratic operation of the servomotor system 126 as it "hunts" for a balance point. It can thus be appreciated that the magnetometer probe assembly 10 of this invention is remarkably noise-free when it is considered that the overall noise signal level of the system is of the order of .0001 volt, and much of this noise level is inherent in the chopper type half wave rectifier 114, and inverter 128.

It is realized that the probe coil 20 and the reference coil 22 should be so positioned within the tubular housing 14 that the potentials produced are either in phase with each other or are 180° out of phase. In practice the alignment of the probe and reference coils 20, 22 may be controlled within a few degrees and such alignment has proven to be adequate in that the small discrepancy from a perfect A. C. null which results causes a reproducible deviation in the balance point of the servo system without giving an indistinct balance point, and therefore can be included in the mass calibration.

In a specific magnetometer probe assembly 10 made as shown in Figs. 1 through 5 the tubular housing 14 is a Bakelite tube 18 inches long of $13/16$ inch outer diameter with a $1/32$ inch wall thickness. Each of the coils 20, 22 is wound on a form with a rectangular winding opening $5/8$ inch by $1 1/8$ inch with winding $3/16$ inch long. Each winding 24 contains about 200 feet of number 46 wire, giving a total resistance of about 1000 ohms.

The leaves of the crossed springs 52, 54 are identical and are made of Phosphor bronze strips. The active section of each spring is 0.875 x 0.25 x 0.020 inch. The weight of the complete vibrating unit is 93 grams. The maximum diameter of the tube 14 is of course limited by the spacing between the poles of the mass spectograph magnet 88.

Magnetometer assemblies made in accordance with this invention have been used experimentally over an extended period of time and have been found to provide great accuracy of field measurement and freedom from mechanical failure. The noise level of the magnetometer probe has been found to be extremely low and accuracies in measuring differences in mass of one part in 10,000 have been readily obtained. While even greater accuracy of mass measurements is possible and practical when probe assemblies of this invention are used, present practices of mass spectograph construction are such that finer measurement of the magnetic fields thereof is not warranted.

I claim:

1. A magnetometer probe assembly comprising an elongated tube of material which is permeable to magnetic fields, said tube containing in the interior thereof two spaced apart galvanometer coils, each coil having a pair of electrical leads, each coil being rigidly secured to said tube, a rigid base, means including two axially aligned substantially identical pairs of spaced apart crossed leaf metal springs which extend transversely through said tube through apertures therein for securing said tube to said base, one of said galvanometer coil leads being connected to each of said leaf springs whereby any potentials developed in said galvanometer coils are conducted from said tube through said springs, and means for mechanically oscillating said tube in a periodic manner around the longitudinal axis thereof.

2. A magnetometer probe assembly comprising an elongated rigid synthetic resin tube, said tube containing in the interior thereof two spaced apart axially aligned galvanometer coils rigidly secured thereto, each coil having a pair of electrical leads, a rigid base, means including two substantially identical pairs of spaced apart crossed leaf metal springs which extend transversely of said tube through apertures therein for securing said tube to said base, said pairs of springs being coaxially aligned with respect to the longitudinal axis of said tube, the upper end of each spring being secured to spring mounting means on said tube, one of said galvanometer coil leads being connected to the upper end of each of said leaf springs whereby any potentials developed in said galvanometer coils are conducted from said tube through said springs, electrical terminal means on said base conductively connected to said springs and means for mechanically oscillating said tube in a periodic manner around the longitudinal axis thereof.

3. A magnetometer probe assembly in accordance with claim 2 wherein said springs are Phosphor bronze.

4. A magnetometer probe assembly in accordance with claim 2, wherein said springs are identical in dimension and material and the leaves of each pair of springs cross at a 90° angle.

5. A magnetometer probe assembly in accordance with claim 2 wherein said tube extends beyond said base on one end thereof, the extended end of the tube containing one of the galvanometer coils.

6. A magnetometer assembly comprising a probe unit including an elongated plastic tube, said tube having two spaced apart galvanometer coils disposed therein and secured thereto, each coil having a pair of electrical leads, means for producing a fixed magnetic field which permeates one of said coils, a rigid base, means including two substantially identical pairs of axially aligned spaced apart crossed leaf metal springs which extend transversely through said tube through apertures therein for securing said tube to said base, one of said galvanometer coil leads being connected to each of said leaf springs whereby any potentials developed in said galvanometer coils are conducted from said tube through said springs, and means including an alternating current excited magnet having a coil winding for mechanically oscillating said tube in a periodic manner around the longitudinal axis thereof.

7. A magnetometer assembly in accordance with claim 6, wherein said means for mechanically oscillating said tube also includes an electronic oscillator having an input circuit and an output circuit, the winding of said alternating current excited magnet being connected in said output circuit and one of said galvanometer coils being connected in said input circuit.

References Cited in the file of this patent
UNITED STATES PATENTS

| | | |
|---|---|---|
| 2,624,783 | Nedzel | Jan. 6, 1953 |
| 2,652,533 | Lush | Sept. 15, 1953 |
| 2,656,504 | Elarde | Oct. 20, 1953 |